United States Patent [19]
Hogan et al.

[11] Patent Number: 6,107,409
[45] Date of Patent: *Aug. 22, 2000

[54] GELS DERIVED FROM EXTENDING GRAFTED COMB POLYMERS AND POLYPROPYLENE VIA A SOLUTION SYNTHESIS

[75] Inventors: Terrence E. Hogan, Cuyahoga Falls; Victor J. Foltz, Akron; David F. Lawson, Uniontown; Xiaorong Wang, Akron, all of Ohio

[73] Assignee: Bridgestone Corporation, Tokyo, Japan

[*] Notice: This patent is subject to a terminal disclaimer.

[21] Appl. No.: 09/073,739

[22] Filed: May 6, 1998

[51] Int. Cl.[7] .......................... C08L 51/00; C08G 63/91; C08F 222/08
[52] U.S. Cl. .............................. 525/285; 525/66; 525/259
[58] Field of Search ................................ 525/285, 66, 259

[56] References Cited

U.S. PATENT DOCUMENTS

| | | | |
|---|---|---|---|
| 3,357,920 | 12/1967 | Nacson . | |
| 3,414,551 | 12/1968 | Reid et al. | 525/285 |
| 3,480,580 | 11/1969 | Joyner et al. | 525/263 |
| 3,481,910 | 12/1969 | Brunson | 525/285 |
| 3,577,365 | 5/1971 | Folzenlogen et al. | 525/285 |
| 3,840,499 | 10/1974 | DiGiulio . | |
| 3,862,265 | 1/1975 | Steinkamp et al. | 525/285 |
| 3,998,907 | 12/1976 | DiGiulio | 525/285 |
| 4,506,056 | 3/1985 | Graylord | 525/285 |
| 4,735,992 | 4/1988 | Nogues . | |
| 5,210,134 | 5/1993 | Akkapeddi et al. | 525/64 |
| 5,244,971 | 9/1993 | Jean-Marc | 525/69 |
| 5,373,048 | 12/1994 | Witzeman et al. . | |
| 5,548,031 | 8/1996 | Doi . | |
| 5,849,824 | 12/1998 | Mercer . | |
| 5,905,116 | 5/1999 | Wang et al. | 525/74 |

FOREIGN PATENT DOCUMENTS

| | | |
|---|---|---|
| 0 322 905 | 12/1988 | European Pat. Off. . |
| 408470 | 1/1991 | European Pat. Off. . |
| 728767 | 8/1996 | European Pat. Off. . |
| 3430802 | 3/1986 | Germany . |
| 42 41 538 A1 | 6/1994 | Germany . |
| 6-248017 | 9/1994 | Japan . |

*Primary Examiner*—James J. Seidleck
*Assistant Examiner*—Olga Asinovsky
*Attorney, Agent, or Firm*—David G. Burleson; Daniel N. Hall; Jude A. Fry

[57] ABSTRACT

The present invention teaches a method for enabling the formation of a high damping, soft polymer gel. The method includes: reacting in a suitable solvent a poly(alkenyl benzene-co-maleic anhydride) and a primary amine to form a poly(alkenyl benzene-co-maleimide) polymer. The poly(alkenyl benzene-co-maleimide) polymer while remaining in solvent is grafted with a maleated polyalkylene through the use of a grafting agent such as an alkyl diamine to form a polyalkylene grafted poly(alkenyl benzene-co-maleimide) polymer product. The solvent is then removed from the polyalkylene grafted poly(alkenyl benzene-co-maleimide) polymer product and the polymer is mixed with extender such as oil sufficient to form the gel. During oil extension the graft copolymer is further crosslinked due to the presence of additional alkyl diamine.

15 Claims, No Drawings

GELS DERIVED FROM EXTENDING GRAFTED COMB POLYMERS AND POLYPROPYLENE VIA A SOLUTION SYNTHESIS

FIELD OF THE INVENTION

The present invention relates to the production of graft copolymers in a solution based polymerization system.

BACKGROUND OF THE INVENTION

The polymerization of styrene and maleic anhydride by free radical initiation is well known in the prior art. Similarly, poly(styrene-co-maleic anhydride) polymer is well known. Further, imidization between a maleic anhydride and a primary amine group is a commonly known chemical reaction. Patent publications which have recognized these reactions include: German Patent DE 4241538, assigned to Leuna-Werke A.-G; Japanese Patent JP 94248017, assigned to Monsanto Kasel Kk.; and, Italian Patent EP 322905 A2, assigned to Montedipe S.p.A. Various other non-patent publications have also recognized these reaction. Include among them are: L. E. Colleman, Jr., J. F. Bork, and H. Donn, Jr., J. Org. Chem., 24, 185(1959); A. Matsumoto, Y. Oki, and T. Otsu, Polymer J., 23 (3), 201 (1991); L. Haeussler, U. Wienhold, V. Albricht, and S. Zschoche, Themochim. Acta, 277, 14(1966); W. Kim, and K. Seo, Macromol. Rapid Commun., 17, 835(1996); W. Lee, and G. Hwong, J. Appl. Polym. Sci., 59, 599(1996); and, I. Vermeesch and G. Groeninckx, J. Appl. Polym. Sci., 53, 1356(1994).

The synthesis of monofunctional N-alkyl and N-aryl maleimides are also well known in the prior art. They have been extensively used to improve the heat stability of homo- and especially copolymers prepared from vinyl monomers. Typically, the bulk resins comprise ABS (poly(acrylonitrile-co-butadiene-co-styrene)) or a polyblend of poly(acrylonitrile-co-butadiene) and poly(styrene-co-acrylonitrile); PVC (poly(vinyl chloride)); SAN (poly(styrene-co-acrylonitrile)); PMMA (poly(methyl methacrylate)); and the like. The maleimides can be copolymerized with other monomers such as acrylonitrile, butadiene, styrene, methyl methacrylate, vinyl chloride, vinyl acetate and many other comonomers. A more preferred practice in the industry is to produce copolymers of maleimides with other monomers such as styrene and optionally acrylonitrile and to blend these with ABS and SAN resins. In any event, the polymer compositions are adjusted so that the copolymers are fully compatible with the bulk resins (e.g., ABS and/or SAN) as shown by the presence of a single glass transition point (T(g)) as determined by differential scanning calorimetry (DSC).

It has long been recognized that two or more polymers may be blended together to form a wide variety of random or structured morphologies to obtain products that potentially offer desirable combinations of characteristics. However, it may be difficult or even impossible in practice to achieve many potential combinations through simple blending because of some inherent and fundamental problem. Frequently, the two polymers are thermodynamically immiscible, which precludes generating a truly homogeneous product. This immiscibility may not be a problem since often it is desirable to have a two-phase structure. However, the situation at the interface between these two phases very often does lead to problems. The typical case is one of high interfacial tension and poor adhesion between the two phases. This interfacial tension contributes, along with high viscosities, to the inherent difficulty of imparting the desired degree of dispersion to random mixtures and to their subsequent lack of stability, giving rise to gross separation or stratification during later processing or use. Poor adhesion leads, in part, to the very weak and brittle mechanical behavior often observed in dispersed blends and may render some highly structured morphologies impossible.

It is particularly desirable to prepare a grafted copolymer having the impact strength of polypropylene and the elastomeric properties of a block copolymer. It is desirable to produce the copolymers at low temperatures, under monitorable conditions while minimizing reaction times but maintaining physical properties of the resultant products. It is also desirable to add an extender or plasticizer to the resultant grafted copolymer in order to obtain a gel copolymer having a low Shore A hardness.

OBJECTS OF THE INVENTION

It is an object of this invention to produce a grafted comb polymer by forming a poly(alkenyl benzene-co-maleimide) in solution and subsequently reacting maleated polypropylene and a diamine with the formed poly(alkenyl benzene-co-maleimide) while still in solution.

Accordingly, it is an object of this invention to provide an oil or low molecular weight component extended grafted comb polymer of a maleated polypropylene and a poly(alkenyl benzene-co-maleimide) that is useful in producing high damping and soft materials and having a service temperature of about 100° C.

SUMMARY OF THE INVENTION

The present invention is directed to an oil or low molecular weight component extended grafted poly(alkenyl benzene-co-maleimide)-polypropylene polymer soft gel composition having damping properties useful in producing molded products having heat resistance and a high elasticity and damping property.

The present invention is broadly directed to the preparation a poly(alkenyl benzene-co-maleimide) in solution by imidizing a poly(alkenyl benzene-co-maleic anhydride) with a primary amine and subsequently producing a grafted polymer by reacting a maleated polyalkylene, a poly(alkenyl benzene-co-maleimide) and a diamine while remaining in solution. The solvent is then removed from the grafted copolymer, and the grafted copolymer is mixed with an extender such as oil. The grafted polymer is a glass-like material that becomes a soft and rubber-like elastomer after being extended.

DETAILED DESCRIPTION OF THE INVENTION

The poly(alkenyl benzene-co-maleimide) is a comb polymer formed by imidizing a poly(alkenyl benzene-co-maleic anhydride) with a primary amine. The comb polymer has a high molecular weight spine connected with many relatively short side chains formed from the addition of the primary amines. The length of the main chain usually equals or is longer than the entanglement length, which is herein defined theoretically as an order of magnitude of 100 repeating units, while the length of the side chains is much smaller than the entanglement length. The preferred alkenyl benzenes contributed monomer units of the poly(alkenyl benzene-co-maleimide) "comb" polymer are either styrene or alpha-methylstyrene. The terms "alkenyl benzene" and "vinyl aromatic" are understood to be interchangeable as used herein.

The poly(alkenyl benzene-co-maleimide) is formed by reacting a poly[alkenylbenzene-co-maleic anhydride] at from about 100° C. to about 150° C., in the presence of a solvent and in the presence of a primary amine. The present invention is preferably directed to a polymer compositions of a poly(styrene-co-maleimide) formed by reacting a poly(styrene-co-maleic anhydride) with a primary amine in the presence of a solvent. Suitable solvents for use in the present invention include but are not limited to: mixtures of aromatic hydrocarbons and cyclic and linear amides. Suitable aromatic hydrocarbons include but are not limited to: xylene, toluene, benzene and the like. Suitable cyclic and linear amides include but are not limited to: N-methypyrrilidinone, dimethylacetamide, dimethylformamide and the like. It is preferable to use the mixture of solvents in a volume ratio of 90 to 5 parts of aromatic hydrocarbons to 10 to 95 parts of cyclic and linear amides, more preferably 90 to 50 parts of aromatic hydrocarbons to 10 to 50 parts of cyclic and linear amides. Other suitable solvents should be obvious to those skilled in the art.

The poly(alkenyl benzene-co-maleimide) described herein are subsequently graft-reacted through a difunctional linking or grafting agent to a maleated polypropylene to yield a maleated polymer having at least one polypropylene segment grafted thereto through the functional linkages thus formed.

It has been determined that it is advantageous to perform both the imidization and the grafting steps in solution. While the graft copolymers may be made by non-solvent, heated blending techniques, the process of preparing the graft copolymer in a solution such as a solvent presents the following advantages. The reaction temperature used in the solvent polymerization is much lower than that required in the corresponding dry, heated blending reaction, thereby resulting in a reduction in the degradation of the resultant polymers. The solvent polymerization permits the ability to monitor the extent of the reaction. The reaction time for conducting the imidization and the grafting steps in solution is reduced by a much as one-half compared to the reaction time required for conducting these steps by a dry process. While the foregoing advantages are obtained by the process of the present invention, the gels created from the graft copolymers produced according to this process have comparable properties to the gels produced in the dry process.

The maleated polypropylene may be any of the conventionally known polypropylene compounds that are subsequently maleated by methods known in the art. The polypropylene grafted segment or segments have average number molecular weights "$M_w$" of about 10,000 up to about 10,000,000, or higher, preferably about 20,000 to about 300,000.

The crystallinity of the polypropylene may vary from being substantially amorphous to being completely crystalline, that is from about 10–100% crystallinity. Most typically, because of the extensive commercial use of isotactic polypropylene, the grafted polypropylene will be substantially crystalline, e.g., greater than about 90%. Generally, the polypropylene is substantially free of ethylene However, under certain circumstances small amounts of ethylene, on the order of less than about 10% by weight, may be incorporated. Furthermore, in certain instances the polypropylene contain small amounts of ethylene in copolymers known as "reactor copolymers". Thus, it is within the scope of the invention that the grafted polypropylene contain minor amounts of ethylene, both as part of ethylene-propylene segments and as polyethylene segments.

Polymerization conditions for the preparation of polypropylene are well known in the art. Propylene can be polymerized into isotactic polypropylene in the presence of stereo-specific Ziegler-Natta catalyst systems comprising compounds of the transition metals of Groups 4 to 6 and 8 of the Periodic Table of elements, preferably titanium compounds, most preferably titanium halides, and organo-metallic compounds of elements of groups 1 to 3 of the Periodic Table, especially aluminum alkyls or aluminum alkyl halides. Illustrative examples include titanium trichloride, titanium tetrachloride as catalysts and triethyla-luminum and diethyl aluminum chloride as cocatalysts. These transition metal catalyst systems can be non-supported or supported, for example, silica gel, or metal oxides and dihalides, such as MgO, $MgCl_2$, $ZnCl_2$, etc. Such systems can be reacted together and can be complexed with a variety of Lewis-base electron donors.

Molecular weight control is typically achieved by the incorporation of hydrogen via a feed stream into the polymerization reactor. The hydrogen is added at about 0 to 30 mole % based on the total monomer. The polymerization reaction is preferably conducted according to the slurry method employing an inert hydrocarbon diluent or liquid propylene as the vehicle. The polymerization temperature can be in the range of about 50° C. to about 100° C. and is preferably at a range or about 60° C. to about 80° C. Polymerization pressure can also vary over a wide range and is not particularly limited. The polymerization pressure can for example be in the range from between atmospheric pressure to 37,000 KPa. Such procedures and components are only illustrative of the knowledge in the art with respect to polypropylene polymerization, any are contemplated as useful within the scope of the invention. For general review of literature and patents in the art see "Olefin Polymers (Polypropylene)" in the Kirk-Othmer Encyclopedia of Chemical Technology, 3rd Edition v. 16, 453–469 (J. Wiley & Sons, 1981).

The maleinization of the polypropylene compound to maleated polypropylene is conveniently accomplished by heating a blend of polypropylene and ethylenically unsaturated carboxyl group-containing compounds, e.g., maleic anhydride, within a range of about 150° to 400° C., often in the presence of free-radical initiators such as organic peroxides that are well-known in the art. Free-radical grafting of the carboxyl group-containing compounds onto the polypropylene readily results. Methods of preparing these grafted polymers are well-known in the art as illustrated, inter alia, in U.S. Pat. Nos. 3,480,580, 3,481,910, 3,577,365, 3,862,265, 4,506,056, and 3,414,551 the disclosures of which are incorporated herein by reference. Such processes are well-known in the art, for example, an independent source of the description of the process is found in Y. Minoura, M. Ueda, S. Mizinuma and M. Oba, J. Applied Polymer Sci. 1625 (1969). The use of heat and/or physical shearing optionally with the free-radical initiators, in such equipment as extruders, masticators, and the like, to simultaneously accomplish controlled degradation in molecular weight of the polypropylene along with the free-radical grafting of the maleic anhydride, also well known in the art, will be useful in accordance with this invention.

In particular, it is preferable to conduct the maleinization with such amounts of maleic anhydride and free-radical initiators, and under conditions of temperature and shearing such that free-radical sites on the polypropylene are formed substantially at the time of scission of the polypropylene chains and are formed at the point of such scission. The maleic anhydride is then grafted onto the scissioned end of one side of such broken chains. In this manner the anhydride groups are located principally at the ends of the maleated polypropylene chains, and the substantial majority of such maleated polypropylene chains contain one site of maleinization. This procedure permits grafting of the maleated polypropylene at its maleated end to the maleated block copolymer though the use of a difunctional linking or grafting agents having two functional groups each functional group being reactive with a maleate group on the polypropylene and block copolymer. Multiple sites of maleinization can lead to grafting of the maleated polypropylene to more than one maleated block copolymer polymer chain or at more than one site of one or more maleated block copolymer. The same substantial chemistry applies to the comb polymers of the present invention.

In accordance with the above, the free-radical initiator is preferably used and will typically be utilized in an amount of from about 0.01 to 1.0 wt. %, preferably from about 0.02 to 0.5 wt. %, and most preferably from about 0.04 to 0.3 wt. % of the total polypropylene, and solvent if used, and will be added first. The mixture is then heated to a temperature at or about the known decomposition temperature of the selected free-radical initiator, concurrently with any optional mechanical shearing. The maleic anhydride is subsequently added in an amount typically from about 0.01 to 10.0 wt. %, preferably from about 0.1 to 5 wt. %, and most preferably about 0.75 to 2 wt. % of the total polypropylene.

The maleated polypropylene of this invention contain from about 0.01 wt. % incorporated maleic anhydride, based upon the weight of the maleated polypropylene, up to about 5 wt. %. Preferably the maleic anhydride content will be from about 0.01 to about 2 wt. %, most preferably about 0.03 to about 0.2 wt. %. As will be apparent, unreacted polypropylene will also be present in the reaction mix as will minor amounts of reaction by-products, such as decomposed free-radical initiator compounds and low molecular weight free-radical products. These by-products are substantially removed, by methods known in the art, e.g., sparging with nitrogen or washing with water. Maleic anhydride may not be left in substantial amounts in the polymer without detrimental effects on the subsequent reaction of the poly (maleimide-co-alkenyl benzene) with the maleated polypropylene.

For the purposes of this invention, poly(alkenyl benzene-co-maleimide) and poly(alkyl benzene-co-maleic anhydride) are defined to encompass random and stereo-specific copolymers, including copolymers having alternating alkenyl benzene and maleimide or maleic anhydride contributed monomer units along the polymer backbone. Such alternating structure are typically described as poly (alkenyl benzene-alt-maleimide) and poly(alkyl benzene-alt-maleic anhydride); however, these polymers are encompassed herein within the descriptions poly(alkenyl benzene-co-maleimide) and poly(alkyl benzene-co-maleic anhydride).

Processes for forming poly(alkyl benzene-co-maleic anhydride) polymers are well known to those skilled in the art. The preparation of the copolymers from electron donor monomers, such as styrene, and electron acceptor monomers, such as maleic anhydride, as a result of complexation of the electron acceptor monomers may be carried out in the absence as well as in the presence of an organic free radical initiator in bulk, or in an inert hydrocarbon or halogenated hydrocarbon solvent such as benzene, toluene, hexane, carbon tetrachloride, chloroform, etc. (N. G. Gaylord and H. Antropiusova, Journal of Polymer Science, Part B, 7, 145 (1969) and Macromolecules, 2, 442 (1969); A. Takahashi and N. G. Gaylord, Journal of Macromolecular Science (Chemistry), A4, 127 (1970).

Poly(alkyl benzene-co-maleic anhydride) polymers are prepared by reacting monomers of alkenylbenzene with maleic anhydride. The preferred alkenyl benzene monomers used for forming the poly(alkyl benzene-co-maleic anhydride) polymer are styrene or α-methylstyrene. Suitable, but less preferred substitutes are: p-methylstyrene, 4-phenylstyrene, m-methylstyrene, o-methylstyrene, p-tert-butylstyrene, dimethylstyrene, and combinations thereof.

The poly(alkyl benzene-co-maleic anhydride) for use in the present invention is a polymer containing from about 5 to 99 mole percent of maleic anhydride monomer with the remainder being alkyl benzene monomer. The preferred poly(alkyl benzene-co-maleic anhydride) contains from 20 to 50 mole percent of maleic anhydride monomer. The most preferred poly(alkyl benzene-co-maleic anhydride) for use in the present invention is poly(styrene-co-maleic anhydride) containing 50 mole percent of maleic anhydride monomer and 50 mole percent of styrene monomer. The comonomers, maleic anhydride and alkenyl benzene, can be randomly or alternatingly distributed in the chain, however, it is preferred to have these comonomers alternating along the polymer backbone chain.

The poly(alkenyl benzene-co-maleic anhydride) has a molecular weight range between about 1,000 and up to about 500,000 or higher, more typically between about 10,000 and 500,000, and even more typically between about 150,000 and 450,000, where the molecular weight is weight-average ("$M_w$").

The poly(alkenyl benzene-co-maleimide) of the instant invention is formed by reacting a poly(alkyl benzene-co-maleic anhydride) with a mono-primary amine at a temperature from about 100° C. to about 150° C. and in the presence of a solvent and preferably under reflux. The primary amine may be added in a singular charge or in sequential partial charges into the reactor containing a charge of poly(alkyl benzene-co-maleic anhydride). Preferably the primary amine is charged in ratio between 0.8 to 1.0 of moles of amine per monomer contributed units of maleic anhydride in the poly(alkyl benzene-co-maleic anhydride).

Suitable primary amine include but are not limited to: alkyl amines; alkyl benzyl amines; alkyl phenyl amines; alkoxybenzyl amines; alkyl aminobenzoates; alkoxy aniline; and other linear primary amines containing from 1 to 50 carbon atoms, preferably 6 to 30 carbon atoms, in the alkyl and alkoxy substituents in these primary amines. It is understood that the alkyl and alkoxy substituents on the above discussed primary amines can be linear or branched, preferably linear, and saturated or unsaturated, preferably saturated. Exemplary, but not exclusive of such amines are: hexylamine, octylamine, dodecylamine and the like.

The poly(alkenyl benzene-co-maleimide), prior to grafting with maleated polypropylene, preferably has a molecular weight range between about 1,000 and up to about 500,000 or higher, more typically between about 10,000 and 500,000, and even more typically between about 150,000 and 450,000, where the molecular weight is weight-average ("$M_w$").

Grafting of maleated polypropylene and poly(alkenyl benzene-co-maleimide) is performed by addition of a grafting agent such as a polyamine, preferably an organic diamine, to a blend of maleated polypropylene and poly (alkenyl benzene-co-maleimide) to partially cross-link the polypropylene to the poly(alkenyl benzene-co-maleimide) through the maleate functional groups.

Suitable organic diamines or diamine mixtures containing two aliphatically or cycloaliphatically bound primary amino groups are used as grafting agents for the process according to the present invention. Such diamines include, for example, aliphatic or cycloaliphatic diamines corresponding to the following general formula: $R_1(NH_2)_2$ wherein $R_1$ represents an aliphatic hydrocarbon group having from 2 to 20 carbon atoms, a cycloaliphatic hydrocarbon group having from 4 to 20 carbon atoms, or an aromatic hydrocarbon group having from 6 to 20 carbon atoms or $R_1$ represents an N-heterocyclic ring having from 4 to 20 carbon atoms, e.g., ethylene diamine; 1,2- and 1,3-propylene diamine; 1,4-diaminobutane; 2,2-dimethyl-1,3-diaminopropane; 1,6-diaminohexane; 2,5-dimethyl-2,5-diaminohexane; 1,6-diamino-2,2,4-trimethyldiaminohexane; 1,8-diaminooctane; 1,10-diaminodecane, 1,11-diaminoundecane; 1,12-diaminododecane; 1-methyl-4-(aminoisopropyl)-cyclohexylamine; 3-aminomethyl-3,5,5-trimethyl-cyclohexylamine; 1,2-bis-(aminomethyl)-cyclobutane; 1,2-diamino-3,6-dimethylbenzene; 1,2- and 1,4-diaminocyclohexane; 1,2-; 1,4-; 1,5- and 1,8-diaminodecalin; 1-methyl-4-aminoisopropyl-cyclohexylamine; 4,4'-diamino-dicyclohexyl; 4,4'-diamino-dicyclohexyl methane; 2,2'-(bis-4-amino-cyclohexyl)-propane; 3,3'-dimethyl-4,4'-diamino-dicyclohexyl methane; 1,2-bis-(4-aminocyclohexyl)-ethane; 3,3',5,5'-tetramethyl-bis-(4-aminocyclohexyl)-methane and -propane; 1,4-bis-(2-aminoethyl)-benzene; benzidine; 4,4'-thiodianiline, 3,3'-dimethoxybenzidine; 2,4-diaminotoluene, diaminoditolylsulfone; 2,6-diaminopyridine; 4-methoxy-6-methyl-m-phenylenediamine; diaminodiphenyl ether; 4,4'-bis(o-toluidine); o-phenylenediamine; o-phenylenediamine, methylenebis(o-chloroaniline); bis(3,4-diaminophenyl) sulfone; diaminodiphenylsulfone; 4-chloro-o-phenylenediamine; m-aminobenzylamine; m-phenylenediamine; 4,4'-$C_1$–$C_6$-dianiline such as 4,4'-methylenedianiline; aniline-formaldehyde resin; and trimethylene glycol di-p-aminobenzoate. Mixtures of these exemplified amines may also be used.

Other suitable polyamines for use as grafting agents in the process according to the present invention include bis-(aminoalkyl)-amines, preferably those having a total of from 4 to 12 carbon atoms, e.g., bis-(2-aminoethyl)-amine, bis-(3-aminopropyl)-amine, bis-(4-aminobutyl)-amine and bis-(6-aminohexyl)-amine, and isomeric mixtures of dipropylene triamine and dibutylene triamine. Hexamethylene diamine, tetramethylene diamine, and especially 1,12-diaminododecane are preferably used.

Thus in the preferred embodiment the process for preparing the grafted polymer of this invention comprises the steps of:

(A) combining a commercially available poly[alkenylbenzene-(co)-(maleic anhydride)] and a primary amine in a solvent under conditions sufficient to react substantially all of the acid anhydride moieties to form the poly(alkenyl benzene-co-maleimide); and, (B) mixing a commercially available maleated polypropylene and a dialkyl amine into the reaction product formed in step (A) while in the presence of the solvent under conditions of elevated temperature and agitation to form a polypropylene-poly(alkenyl benzene-co-maleimide) graft copolymer;

(C) separating and recovering the polypropylene-poly(alkenyl benzene-co-maleimide) graft copolymer from the solvent; and, (D) adding an extender oil with additional dialkylamine dissolved in the extender to the polypropylene-poly(alkenyl benzene-co-maleimide) graft copolymer of step (C) under conditions of agitation.

In broadest terms the process for preparing the grafted polymer of this invention comprises combining the poly(alkenyl benzene-co-maleimide) with the maleated polypropylene and the grafting agent under conditions sufficient to permit grafting of at least a minor portion of the poly(alkenyl benzene-co-maleimide) onto the polypropylene. Thus the grafted comb polymer composition of this invention will comprise the reaction product of the above described poly(alkenyl benzene-co-maleimide), grafting agent and the maleated polypropylene. The grafting reaction is accomplished by contacting the grafting agent and the poly(alkenyl benzene-co-maleimide) with the maleated polypropylene whereupon interaction and cross linking take place. Apparently, the primary amino groups of the grafting agent react to form covalent chemical bonds (imide bonds) with the maleic moieties of the maleated polypropylene and the poly(alkenyl benzene-co-maleimide). The polypropylene is thus grafted to the poly(alkenyl benzene-co-maleimide) through covalent chemical functional linkages.

For best results, a proportion of approximately one-half molar equivalent of grafting agent per molar equivalent of maleic moiety can be employed due to the difunctionality of the grafting agent. The contacting can be accomplished by combining solutions of the polymeric reactants in suitable solvents, such as benzene, toluene, xylene, and other inert organic and inorganic solvents, in a suitable reaction vessel under substantially anhydrous conditions. Heating will accelerate the reaction and is generally preferred. It is important that essentially all moisture or water be removed by drying prior to contacting the polymer reactants in order to avoid hydrolysis reactions which will compete with the sought cross linking and reduce the yield of the grafted copolymer composition of this invention.

The amounts of poly(alkenyl benzene-co-maleimide) and maleated polypropylene reacted into the grafted compositions of the invention may vary somewhat depending upon the properties desired in the finished composition. In general, the amounts of maleated polypropylene included in the grafted composition may range from about 1 to about 50 percent by weight based on total weight of composition. Preferred amounts of maleated polypropylene are from 1 to 30 percent by weight with a particularly preferred amount being from 10 to 25 percent by weight. The amounts of poly(alkenyl benzene-co-maleimide) comb polymer included in the grafted composition may range from about 99 to about 50 percent by weight based on total weight of composition. Preferred amounts of the comb polymer are from 99 to 70 percent by weight with a particularly preferred amount being from 90 to 75 percent by weight.

Prior to mixing the graft copolymers with extenders such as oils, the solvent is removed from the graft copolymers by conventional desolventization methods such as drum drying, steam desolventization and precipitation. After the solvent has been removed the graft copolymer is mixed with the extender in the absence of solvents in a suitable, conventional mixing apparatus such as an open-type mixing roll, closed-type Banbury mixer, closed type Brabender mixer, extruding machine, kneader, continuous mixer, etc. The closed-type Brabender mixer is preferable, and mixing in an inactive gas environment, such as nitrogen or argon, is also preferable. Suitable extenders include extender oils and low molecular weight compounds or components. Suitable extender oils include those well known in the art such as naphthenic, aromatic and paraffinic petroleum oils and silicone oils.

Examples of low molecular weight organic compounds or components useful as extenders in the compositions of the present invention are low molecular weight organic materials having a number-average molecular weight of less than 20,000, preferable less than 10,000, and most preferably less than 5,000. Although there is no particular limitation to the material which may be employed, the following is a list of examples of appropriate materials.

(1) Softening agents, namely aromatic naphthenic and paraffinic softening agents for rubbers or resins;
(2) Plasticizers, namely plasticizers composed of esters including phthalic, mixed phthalic, aliphatic dibasic acid, glycol, fatty acid, phosphoric and stearic esters, epoxy plasticizers, other plasticizers for plastics, and phthalate, adipate, sebacate, phosphate, polyether and polyester plasticizers for NBR;
(3) Tackifiers, namely coumarone resins, coumarone-indene resins, terpene phenol resins, petroleum hydrocarbons and rosin derivative;
(4) Oligomers, namely crown ether, flourine-containing oligomers, polybutenes, xylene resins, chlorinated rubber, polyethylene wax, petroleum resins, rosin ester rubber, polyalkylene glycol diacrylate, liquid rubber (polybutadiene, styrene/butadiene rubber, butadiene-acrylonitrile rubber, polychloroprene, etc.), silicone oligomers, and poly-α-olefins;
(5) Lubricants, namely hydrocarbon lubricants such as paraffin and wax, fatty acid lubricants such as higher fatty acid and hydroxy-fatty acid, fatty acid amide lubricants such as fatty acid amide and alkylene-bis-fatty acid amide, ester lubricants such as fatty acid-lower alcohol ester, fatty acid-polyhydric alcohol ester and fatty acid-polygylcol ester, alcholic lubricants such as fatty alcohol, polyhydric alcohol, polyglycol and polyglycerol, metallic soaps, and mixed lubricants; and,
(6) Petroleum hydrocarbons, namely synthetic terpene resins, aromatic hydrocarbon resins, aliphatic hydrocarbon resins, aliphatic cyclic hydrocarbon resins, aliphatic or alicyclic petroleum resins, aliphatic or aromatic petroleum resins, polymers of unsaturated hydrocarbons, and hydrogenated hydrocarbon resins.

Other appropriate low-molecular weight organic materials include latexes, emulsions, liquid crystals, bituminous compositions, and phosphazenes. One or more of these materials may be used as extenders.

In accordance with the present invention, the grafted polymer containing gel composition of the present invention may have added thereto at least about 10, preferably 30 to 1,000, parts by weight of extender per 100 parts by weight of the grafted copolymers. Most preferred amounts of added extender include from about 50 to about 500 parts of oil per 100 parts of grafted copolymer and ideally about 80 to about 300 parts of extender per 100 parts of grafted copolymer. The weight percent ratio of the polyalkylene grafted poly (alkenyl benzene-co-maleimide) to the extender is from about 10:1 to about 1:100, preferably 5:1 to 1:5.

The polymer gels produced according to the present invention generally have high damping properties having a tan δ in the range of about 0.1 to about 1.0, preferably higher than 0.3 over the temperature range of −20° C. to 70° C., and a Shore A hardness ranging from 0 to about 50, preferably about 0 to about 30, most preferably about 0 to 2 at about 20° C. to 25° C. or at room temperature. The service temperature of the gels of the present invention is less than or equal to 100° C. for most of the polymers of the present invention, e.g., 100° C. compression set of the gel is about 65. Some of the extended polymers of the present invention have a potential use up to 140° C.

It is frequently desirable to include other additives well known in the rubber art to the compositions of the present application. Stabilizers, antioxidants, conventional fillers, reinforcing agents, reinforcing resins, pigments, fragrances and the like are examples of some such additives. Specific examples of useful antioxidants and stabilizers include 2-(2'-hydroxy-5'-methylphenyl) benzotriazole, nickel dibutyldithiocarbamate, zinc dibutyl dithiocarbamate, tris (nonylphenyl) phosphite, 2,6-di-t-butyl-4-methylphenol and the like. Exemplary conventional fillers and pigments include silica, carbon black, titanium dioxide, iron oxide and the like. These compounding ingredients are incorporated in suitable amounts depending upon the contemplated use of the product, preferably in the range of 1 to 350 parts of additives or compounding ingredients per 100 parts of grafted copolymer.

A reinforcement may be defined as the material that is added to a resinous matrix to improve the strength of the polymer. Most of these reinforcing materials are inorganic or organic products of high molecular weight. Various examples include glass fibers, asbestos, boron fibers, carbon and graphite fibers, whiskers, quartz and silica fibers, ceramic fibers, metal fibers, natural organic fibers, and synthetic organic fibers. Other elastomers and resins are also useful to enhance specific properties like damping properties, adhesion and processability. Examples of other elastomers and resins include adhesive-like products including Reostomer (produced by Riken-Vinyl Inc.), hydrogenated polystyrene-(medium or high 3,4) polyisoprene-polystyrene block copolymers such as Hybler (produced by Kurare Inc.), polynorbornenes such as Norsorex (produced by Nippon Zeon Inc.) and the like. In this case the foregoing materials are equally applicable to the instant comb polymer compositions.

The gels containing oil or low molecular weight component extended and polypropylene compositions of the present invention may be prepared by any means well known in the art for combining such ingredients, such as solution blending, milling, internal batch mixing, or continuous extrusion of a solid form of the comb polymer and polypropylene compositions and the other ingredients. A rapid and convenient method of preparation comprises heating a mixture of the components to a temperature of about 50° C. to about 290° C. It is optional, but preferable, to add a diamine, as previously identified as grafting agents, to the heated oil blending step to promote crosslinking of the comb polymers. Such diamines can be used in amounts commensurate with typical amounts of crosslinking agents well known in the art, such as 0.1 to 2 weight percent of the comb polymer.

The gels containing oil extended grafted poly(alkenyl benzene-co-maleimide)-polypropylene compositions of the present invention can be manufactured by mixing and dynamically heat-treating the components described above, namely, by melt-mixing. As for the mixing equipment, any conventional, generally known equipment such as an open-type mixing roll, closed-type Banbury mixer, extruding machine, kneader, continuous mixer, etc., is acceptable. The closed-type is preferable, and mixing in an inactive gas environment, such as nitrogen or carbon dioxide, is also preferable.

The gel composition obtained using the manufacturing method of this invention can be molded with equipment conventionally used for molding thermoplastics. It is suitable for extrusion molding, calendar molding, and particularly injection molding. The resultant gel composition may be molded in appropriate press ovens and the like to form products in the form of extruded pellets, cut dices, preferably as small as possible since smaller pellets provide short heating times and better flow when utilized in flow molding. Ground pellets may also be utilized.

The extended grafted comb polymers of the present invention can be used in high temperature applications including uses in injection molding or in any other compositions typically used for elastomeric properties.

In summary, the molded polymers produced from the gels containing extended grafted poly(alkenyl benzene-co-maleimide) and polypropylene compositions of the present invention retain elastomeric characteristics and are useful in high temperature applications and/or high damping applications.

Damping is the absorption of mechanical energy by a material in contact with the source of that energy. It is desirable to damp or mitigate the transmission of mechanical energy from, e.g., a motor, engine, or power source, to its surroundings. Elastomeric materials are often used for this purpose. It is desirable that such materials be highly effective in converting this mechanical energy into heat rather than transmitting it to the surroundings. It is further desirable that this damping or conversion is effective over a wide range of temperatures and frequencies commonly found near motors, automobiles, trucks, trains, planes, and the like.

A convenient measurement of damping is the determination of a parameter called tan δ. A forced oscillation is applied to a material at frequency f and the transmitted force and phase shift are measured. The phase shift angle delta is recorded. The value of tan δ is proportional to the ratio of (energy dissipated)/(energy stored). The measurement can be made by any of several commercial testing devices, and may be made by a sweep of frequencies at a fixed temperature, then repeating that sweep at several other temperatures, followed by the development of a master curve of tan δ vs. frequency by curve alignment. An alternate method is to measure tan δ at constant frequency (such as at 10 hz) over a temperature range. We have defined a thermoplastic unfilled material as useful for damping when tan δ>~0.3 over at least a 4 decade range, preferably a 6 decade range of frequency.

It is further important that this high degree of absorption of energy be accompanied by good mechanical and thermal stability, as the part prepared from the subject polymers will be cycled through various environments and repeatedly such to various forces of compression, tension, bending, and the like.

The compositions of the present invention are favorably used in the manufacturing of any product in which the following properties are advantageous: a high degree of softness, heat resistance, decent mechanical properties, elasticity and/or high damping. The compositions of the present invention can be used in all industry fields, in particular, in the fabrication of automotive parts, tire tread rubbers, household electrical appliances, industrial machinery, precision instruments, transport machinery, constructions, engineering, and medical instruments.

Representative examples of the use of the extended graft polymers of the present invention are in the fabrication of damping materials and vibration restraining materials. These uses involve connecting materials such as sealing materials, packing, gaskets and grommets, supporting materials such as mounts, holders and insulators, and cushion materials such as stoppers, cushions, and bumpers. These materials are also used in equipment producing vibration or noise and household electrical appliances, such as in air-conditioners, laundry machines, refrigerators, electric fans, vacuums, driers, printers and ventilator fans. Further, these materials are also suitable for impact absorbing materials in audio equipment and electronic or electrical equipment, sporting goods and shoes. Further, as super low hardness rubbers, these materials are applicable for use in appliances, damping rubbers, and as low hardness plastics, it is preferable for molding materials. Further, because the present compositions can be used to control the release of internal low molecular weight materials out from the compositions, it is useful as a release support to emit materials such as fragrance materials, medical materials and other functional materials. The compositions of the present invention also possess utility in applications of use in liquid crystals, adhesive materials and coating materials.

Specific examples of uses of the compositions of the present invention as damping materials are as follows:

in audio equipment, such as in insulators for a portable CD or a CD mounted on a vehicle, mike holders for home video cassette recorder, radio cassette recorder, karaoke or handy mike, etc., an edge cone of a speaker, a tape holder of a radio cassette, a holder of a portable mini-disk player, an optical disk holder of a digital video disk, etc.;

in information relating equipment, such as in insulators for a hard disk, insulators for motors such as a spindle motor for HHD and stepping motor, insulators for floppy disk drive, insulators for CD-ROM of personal computer, and a holder for optical disk;

in communication equipment, such as in a holder for compact high performance mike or speaker of a portable telephone, a pocket bell or PHS, a mike holder for a wireless equipment, and a disk holder for portable note type electronic equipment;

in home electronics equipment, such as in insulators for CD-ROM of home TV game, insulators for cassette holder or CD-ROM of cassette holder or game machine, a holder of high performance mike, and cone edge of speaker; and in other applications, such as in damping materials for printer head of a wordprocessor, printer of personal computer, small or middle handy type printer, or name printers, and insulators for CD-ROM used for measure equipment.

In the following, the present invention will be described in more detail with reference to non-limitative examples. The following examples and tables are presented for purposes of illustration only and are not to be construed in a limiting sense.

EXAMPLE 1

Polypropylene grafted poly(styrene-alt-n-octylmaleimide) was prepared as follows. A two liter reaction kettle equipped with a mechanical stirrer, addition funnel, Dean-Stark trap, and reflux condenser was changed with 300 ml of dimethylacetamide and 700 ml of xylene. Poly(styrene-alt-maleic anhydride) containing 15% methyl ester (obtained from Monsanta under trade name Scripset 520, Mn=350K) (103.3 g) was added to kettle with stirring. The reaction was then heated at reflux (137–144° C.) until 4 ml of aqueous layer was collected in the trap (~1.5 h). N-octylamine (80.3 ml) was then added slowly over five minutes. Reflux was maintained until an addition 13 ml of aqueous layer was collected in the trap (~4 h) to the reactor was then added 40 g of commercial maleated polypropylene (from the Exxon Chemical Company, trade name Exxelor PO 1015). This reaction change was allowed to mix for 15 minutes at reflux. A solution of 0.24 g 1,10-diaminodecane in 100 ml of 30:70 dimethylacetamide:xylene was then added quickly. This addition caused the solution to become viscous. The reactor was then cooled to room temperature and the polymer was coagulated in hexane. Following several rinses of hexane, the polymer was drum dried. The recovered polymer weighted 155.17 g representing a 77.6% yield.

EXAMPLE 2

Polypropylene grafted poly(styrene-alt-n-hexylmaleimide) was prepared as follows. The procedure of Example 1 was followed with the following modifications. A charge of 70.4 ml of N-hexylamine (Aldrich Chemical Co., 99% pure) was used in place of the N-octylamine. The recovered polymer weighed 175.45 g representing a 87.7% yield.

EXAMPLE 3

A Brabender mixer (50 g capacity) was charged with 25 g of the polymer product from Example 1 and 12.5 g of trioctylphosphate (extender oil) under a nitrogen purge. The Brabender mixer was then heated to 170° C. and the agitation speed was set to 20 rpm. After 5 minutes, the agitation speed was increased to 90 rpm. A solution of 0.142 g of 1,10-diaminodecane in 12.5 g of trioctylphosphate was added after 80 minutes later. Finally, at 240 minutes total reaction time, the product was removed from the Brabender mixer at 170° C.

EXAMPLE 4

To a Brabender mixer (50 g capacity) was added 25 g of the product from Example 2 and 12.5 g of trioctylphosphate (extender oil) under nitrogen purge. Brabender mixer was then heated to 170° C. and agitation speed set to 20 rpm. After 5 minutes, the agitation speed was increased to 90 rpm. A solution of 0.142 g 1,10-diaminodecane in 12.5 g of trioctylphosphate was added 80 minutes later. Finally, at 240 minutes total reaction time, the material was removed from the Brabender mixer at 170° C.

The products were thereafter molded into sheets and cylinder buttons at ~155° C. Ring samples were cut from these sheet for tensile measurements. The details of their physical properties are listed in the following Table 1:

TABLE 1

| Example No. | Polymer used | Tan δ at 25° C. | C.S.[1] (100° C.) | Tb/Eb[2] (psi/%) | ASKER C at 25° C. |
| --- | --- | --- | --- | --- | --- |
| 3 | Example 2 | 0.4847 | 69.8 | 28.7/134 | 34 |
| 4 | Example 1 | 0.406 | 60.3 | 31.5/107.9 | 37 |

[1]The Compression Set (C.S.) was measured based on conditions of ASTM D395-89, except that the sample size and displacement were changed as follows: Sample height - 0.5 inches; Sample diameter - 0.55 inches; Displacement - Sample is compressed to 0.375 inches and stored in an oven at 100° C. (or at 150° C. in subsequent examples) for 22 hours. The sample is removed from the oven, the stress on the sample is relieved, the sample is stored at room temperature for 30minutes and the recovery of the sample is measured as the final sample height as X in: Compression Set = ((0.5 − X)/(0.5−0.375)) × 100%.
[2]Ratio of tensile strength(psi) to elongation at break (%)

We claim:

1. A method for the formation of a comb polymer, comprising:
   reacting from about 50 wt % to about 99 wt % of a poly(alkenyl benzene-co-maleimide) and about 1 wt % to about 50 wt % of a maleated polyalkylene and from about 0.1 to about 10 wt % of a diamine in a solvent under conditions sufficient to form a polyalkylene grafted poly(alkenyl benzene-co-maleimide) comb polymer.

2. The method of claim 1, further comprising the steps of: separating the solvent from the polyalkylene grafted poly (alkenyl benzene-co-maleimide) comb polymer and mixing said recovered polyalkylene grafted poly(alkenyl benzene-co-maleimide) comb polymer with an extender oil in an amount sufficient to from a gel.

3. The method of claim 1, further comprising the step of: mixing said polyalkylene grafted poly(alkenyl benzene-co-maleimide) with an extender wherein a weight percent ratio of the polyalkylene grafted poly(alkenyl benzene-co-maleimide) to the extender is from about 10:1 to about 1:100.

4. The method of claim 1, further comprising the step of: mixing said polyalkylene grafted poly(alkenyl benzene-co-maleimide) with an extender wherein a weight percent ratio of the polyalkylene grafted poly(alkenyl benzene-co-maleimide) to the extender is from about 5:1 to 1:5.

5. The method of claim 1, wherein the alkenyl benzene contributed monomer units of said poly(alkenyl benzene-co-maleimide) is selected from the group consisting of: styrene, α-methylstyrene, p-methylstyrene, 4-phenylstyrene, m-methylstyrene, o-methylstyrene, p-tert-butylstyrene, dimethylstyrene, and mixtures thereof.

6. The method of claim 1, wherein the alkylene contributed monomer units of said maleated polyalkylene is selected from the group consisting of ethylene, propylene and mixtures thereof.

7. The method of claim 1 wherein the maleimide contributed monomer units of the poly(alkenyl benzene-co-maleimide) is formed by the reaction of maleic anhydride and a primary amine.

8. The method of claim 6 wherein the primary amine is selected from the group consisting of: alkyl amines; alkyl benzyl amines; alkyl phenyl amines; alkoxybenzyl amines; alkyl aminobenzoates; and alkoxy aniline; containing from 1 to 50 carbon atoms in the alkyl and alkoxy substituents in the primary amine.

9. The method of claim 1 wherein said diamine is selected from the group consisting of: aliphatic or cycloaliphatic diamines corresponding to the following general formula: $R_1(NH_2)_2$ wherein $R_1$ represents an aliphatic hydrocarbon group having from 2 to 20 carbon atoms, a cycloaliphatic hydrocarbon group having from 4 to 20 carbon atoms, or an aromatic hydrocarbon group having from 6 to 20 carbon atoms or $R_1$ represents an N-heterocyclic ring having from 4 to 20 carbon atoms.

10. The method of claim 1 wherein said diamine is selected from the group consisting of: ethylene diamine; 1,2- and 1,3-propylene diamine; 1,4-diaminobutane; 2,2-dimethyl-1,3-diaminopropane; 1,6-diaminohexane; 2,5-dimethyl-2,5-diaminohexane; 1,6-diamino-2,2,4-trimethyldiaminohexane; 1,8-diaminooctane; 1,10-diaminodecane; 1,11-diaminoundecane; 1,12-diaminododecane; 1-methyl-4-(aminoisopropyl)-cyclohexylamine; 3-aminomethyl-3,5,5-trimethyl-cyclohexylamine; 1,2-bis-(aminomethyl)-cyclobutane; 1,2-diamino-3,6-dimethylbenzene; 1,2- and 1,4-diaminocyclohexane; 1,2-; 1,4-; 1,5- and 1,8-diaminodecalin; 1-methyl-4-aminoisopropyl-cyclohexylamine; 4,4'-diamino-dicyclohexyl; 4,4'-diamino-dicyclohexyl methane; 2,2'-(bis-4-amino-cyclohexyl)-propane; 3,3'-dimethyl-4,4'-diamino-dicyclohexyl methane; 1,2-bis-(4-aminocyclohexyl)-ethane; 3,3',5,5'-tetramethyl-bis-(4-aminocyclohexyl)-methane and -propane; 1,4-bis-(2-aminoethyl)-benzene; benzidine; 4,4'-thiodianiline, 3,3'-dimethoxybenzidine; 2,4-diaminotoluene, diaminoditolylsulfone; 2,6-diaminopyridine; 4-methoxy-6- methyl-m-phenylenediamine; diaminodiphenyl ether; 4,4'-bis(o-toluidine); o-phenylenediamine; o-phenylenediamine, methylenebis(o-chloroaniline); bis(3,4-diaminophenyl) sulfone; diaminodiphenylsulfone; 4-chloro-o-phenylenediamine; m-aminobenzylamine; m-phenylenediamine; 4,4'-$C_1$–$C_6$-dianiline such as 4,4'-methylenedianiline; aniline-formaldehyde resin; trimethylene glycol di-p-aminobenzoate; bis-(2-aminoethyl)-amine, bis-(3-aminopropyl)-amine, bis-(4-aminobutyl)-amine; bis-(6-aminohexyl)-amine, isomeric mixture of dipropylene triamine and dibutylene triamine; and mixtures thereof.

11. The method of claim 1 wherein the solvent is a mixture of at least one aromatic hydrocarbon solvent and at least one cyclic or linear amide solvent.

12. The method of claim 11 wherein the aromatic hydrocarbon solvent is selected from the group consisting of: xylene, toluene and benzene.

13. The method of claim 11 wherein the amide solvent is selected from the group consisting of: N-methypyrrilidinone, dimethylacetamide and dimethylformamide.

14. The method of claim 11 wherein the mixture of solvents is in a volume ratio of 90 to 5 parts of aromatic hydrocarbons to 10 to 95 parts of cyclic and linear amides.

15. The method of claim 11 wherein the mixture of solvents is in a volume ratio of 90 to 50 parts of aromatic hydrocarbons to 10 to 50 parts of cyclic and linear amides.

* * * * *